United States Patent
Ito

(10) Patent No.: US 7,738,011 B2
(45) Date of Patent: Jun. 15, 2010

(54) CAMERA CONTROL SYSTEM

(75) Inventor: Tetsuya Ito, Koganei (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 1105 days.

(21) Appl. No.: 11/221,839

(22) Filed: Sep. 9, 2005

(65) Prior Publication Data

US 2006/0061664 A1 Mar. 23, 2006

(30) Foreign Application Priority Data

Sep. 21, 2004 (JP) ............................ 2004-272983

(51) Int. Cl.
H04N 5/232 (2006.01)
H04N 5/225 (2006.01)

(52) U.S. Cl. .............................. 348/211.11; 348/207.11

(58) Field of Classification Search ............ 348/211.99, 348/211.1, 211.2, 211.3, 211.4, 211.6, 211.8, 348/211.9, 211.11, 211.14, 14.05, 207.11
See application file for complete search history.

(56) References Cited

U.S. PATENT DOCUMENTS

| | | | |
|---|---|---|---|
| 6,208,379 B1 * | 3/2001 | Oya et al. | 348/211.11 |
| 6,803,950 B2 * | 10/2004 | Miyamoto et al. | 348/231.6 |
| 6,919,921 B1 * | 7/2005 | Morota et al. | 348/211.11 |
| 2002/0041324 A1 * | 4/2002 | Satoda | 348/14.05 |
| 2002/0101514 A1 * | 8/2002 | Watanabe | 348/211 |
| 2002/0122122 A1 * | 9/2002 | Senda | 348/240.3 |
| 2003/0090690 A1 * | 5/2003 | Katayama et al. | 358/1.9 |
| 2003/0184652 A1 * | 10/2003 | Tanaka et al. | 348/207.1 |
| 2003/0206238 A1 * | 11/2003 | Kawai et al. | 348/333.01 |
| 2004/0024876 A1 | 2/2004 | Ito et al. | |
| 2005/0185055 A1 * | 8/2005 | Miller et al. | 348/207.1 |

FOREIGN PATENT DOCUMENTS

| | | |
|---|---|---|
| AU | 750206 | 12/1999 |
| JP | 06-311419 | 11/1994 |
| JP | 11346358 | 12/1999 |
| JP | 200258016 | 2/2002 |

OTHER PUBLICATIONS

CN 1240323 corresponds to JP 11-346358, Jan. 5, 2000.
CN 1446434 corresponds to JP 2002-058016, Oct. 1, 2003.

* cited by examiner

*Primary Examiner*—Sinh Tran
*Assistant Examiner*—Albert H Cutler
(74) *Attorney, Agent, or Firm*—Brundidge & Stanger, P.C.

(57) ABSTRACT

A camera control system consists of a plurality of camera apparatus, camera control units coupled to the plural camera apparatus, respectively, a transmission path connected to the camera units and a base station connected to the transmission path. The base station has a database and the database is stored with setting values concerning at least photographing direction, image quality and voice quality of the plural camera apparatus and the plural camera control units in a plurality of table formats. An arbitrary camera control unit has a memory unit. A desired setting value of those stored in the database is down loaded to the memory unit on the basis of a command from the camera control unit and the setting values of the plural camera apparatus and camera control units are modified with the down loaded setting value.

12 Claims, 8 Drawing Sheets

■ DATA BASE FUNCTION 1

DATA BASE IP : 192.132.1.0
CCU IP : 192.132.1.200

ACTION : UP LOAD
   UPLOAD FILE : PICTURE
                      CAMERA FILE
                      CCU FILE

CAMERA : 201-n
CCU : 203-n

FIG. 8

TABLE

| CAMERA No. | PRESET No. | PAN ANGLE | TILT ANGLE | ZOOM MAGNIFICATION |
|---|---|---|---|---|
| CAMERA UNIT 201-1 | PRESET 1 | 21 | 10 | 10 |
| | PRESET 2 | 35 | −20 | 30 |
| | .... | .... | .... | .... |
| | PRESET N | 10 | 43 | 15 |
| ...... | ...... | ...... | ...... | ...... |
| CAMERA UNIT 201-n | PRESET 1 | 10 | 15 | 15 |
| | .... | .... | .... | .... |
| | PRESET M | 30 | 10 | 20 |

FIG. 9

TABLE

| SERVICE RANK | CHARGE MONEY AMOUNT |
|---|---|
| A1 | B1 |
| A2 | B2 |
| ⋮ | ⋮ |
| An | Bn |

CAMERA CONTROL SYSTEM

INCORPORATION BY REFERENCE

The present application claims priority from Japanese application JP2004-272983 filed on Sep. 21, 2004, the content of which is hereby incorporated by reference into this application.

BACKGROUND OF THE INVENTION

The present invention relates to camera control systems and more particularly, to a camera control system for centralizedly making adjustments and maintenance of a plurality of television camera apparatus.

Conventionally, in a camera apparatus for television broadcasting and video production or for industrial use, various values to be set to every one of the cameras provided at a photographing spot are saved in a camera controller located remotely from the camera apparatus. The data must however be managed camera by camera by an engineer in charge of adjustments of the cameras and normally a large number of values are set, thereby raising a problem that the setting operation becomes sophisticated.

A controller of television camera is known in which for the purpose of confirming whether a camera for reference use and another camera in adjustment are placed in the same condition, a means is provided for automatically switching video signals of these cameras and displaying them in an overlapped fashion. Such a controller as above is disclosed in, for example, JP-A-6-311419 entitled "Centralized Controller of the Television Camera". But the prior art controller in no way considers setting, management, adjustment and reutilization of various setting values (control parameters) of those cameras and especially, as the number of setting values increases, the operation of setting the values to the cameras becomes sophisticated undoubtedly. The prior art reference does not take diagnosis of abnormality of the cameras and maintenance thereof into account, either.

SUMMARY OF THE INVENTION

An object of the present invention is to provide a camera control system capable of facilitating adjustments and maintenance of a camera apparatus.

Another object of the invention is to provide a camera control system capable of centralizedly managing adjustments and maintenance of a camera apparatus.

Still another object of the invention is to provide a camera control system which can assure service of adjustments and maintenance of a camera apparatus.

A camera control system according to one aspect of this invention comprises:

a plurality of camera apparatus each having at least a camera unit;

camera control units coupled to the plural camera apparatus, respectively;

at least one base station; and a transmission path for connecting the respective camera control units to the base station, wherein the base station includes a database, adapted to store setting values concerning at least image quality of the plural camera apparatus and the plural camera control units, and each of the plural camera control units has a memory unit, whereby on the basis of a command from at least one arbitrary camera control unit, a predetermined setting value is down loaded from the setting values stored in the database to the memory unit of that camera control unit and with the down loaded predetermined setting value, setting values of the arbitrary camera control unit and of an associated camera control apparatus are modified.

Preferably, pieces of the data stored in the database are registered in a table format in respect of individual menus of plural processing functions.

Preferably, monitor display units connected to the camera control units, respectively, are further provided, an arbitrary camera control unit is so constructed as responding to a command by an operator of the camera control unit to be able to select a desired menu from the plural processing functions, and the display monitor unit is so constructed as to display the selected menu.

Preferably, the camera control unit is so constructed as to respond to a command of the operator to display registration data related to the selected and displayed menu on the monitor display unit.

Preferably, the data registered in the database includes a sample image, data for identifying the sample image and parameters of the cameral control unit and those of the camera apparatus when the sample image is picked up.

Preferably, at least one of the plural camera apparatus has a microphone and a pan and tilt head and the database is registered with, in addition to the setting value concerning the image quality, setting values concerning photographing direction and voice quality.

A camera control system according to another aspect of the invention comprises:

a plurality of camera apparatus each having at least a camera unit;

camera control units coupled to the plural camera apparatus, respectively;

at least one base station; and a transmission path for connecting the respective camera control units to the base station, wherein the base station includes a database and a terminal unit provided with a display unit, each camera control unit is so constructed as to have a memory unit responsive to an operation by an operator of the camera control unit to store setting values at present of the camera control unit and an associated camera apparatus as well as an image from the camera apparatus and to register the stored setting value and the image in the database of the base station, and the terminal unit of the base station is so constructed as to access the database in response to an operation of the operator of the terminal unit and display the registered setting value and image on the display unit of the terminal unit in a modifiable fashion.

Preferably, the terminal unit is so constructed as to create an image of modification object and an image of comparison object from at least the registered image to display them on the display unit, to enable the operator to display parameters related to the displayed image in a modifiable fashion and to transmit parameters of the image modified by the operator to the camera control unit.

Preferably, the terminal unit is so constructed as to respond to a request from an operator of an arbitrary camera control unit to select an image of diagnostic object and its parameters from the data registered in the database so as to display them on the display unit in a diagnosable fashion, and the base station is so constructed as to be able to transmit results of diagnosis based on the displayed image and parameters to the camera control unit.

Preferably, the base station has a money charge unit responsive to a request from an operator of the camera control unit to charge for the diagnosis.

Preferably, the plural camera apparatus and the plural camera control units are configured to a client system, at least the one base station constitutes a service center and the transmission path includes Internet for coupling the client system and the service center.

Preferably, the server is so constructed as to have a money charge unit, transmit the image and setting values modified in compliance with the image from the camera control unit and a modification request for modifying the setting values to the camera control unit and charge money in accordance with a predetermined money charge schedule.

Other objects, features and advantages of the present invention will become apparent by reading the following description of embodiments of the invention in conjunction with the accompanying drawings.

BRIEF DESCRIPTION OF THE DRAWINGS

FIG. 8 is a diagram showing an example of various setting values registered in a table format in a database 209 of a base station.

FIG. 9 is a diagram showing an example of a money charge schedule registered in a table format in the FIG. 5 system.

DESCRIPTION OF THE EMBODIMENTS

In most cases, a camera apparatus for television broadcasting and video production or a television camera apparatus for industrial use including a monitor camera (hereinafter simply referred to as a camera apparatus or camera) is incorporated in a camera control system in which various kinds of control of the camera apparatus are carried out from a remote location. For example, in this type of system, various kinds of control operations of a plurality of camera apparatus installed at a photographing spot by using pan and tilt heads or carried by hands or on the shoulders of camera persons are conducted from one monitor room or a relay car for broadcasting at a remote location. There are a variety of camera apparatus depending on their types. Various control parameter values for view field and video adjustments of the camera unit and for aural adjustments in the case of the camera apparatus provided with a microphone are remotely controlled from a camera control unit associated with the camera apparatus. In the case of a camera apparatus for industrial use or monitoring use, the view field and photographing direction of the camera apparatus carried on the pan and tilt head are also controlled. It will be appreciated that the camera apparatus is connected to the camera control unit by a cable, for instance. The camera control system is so constructed as to enable the camera control unit to feed electrical power to the camera apparatus.

Figure 7:
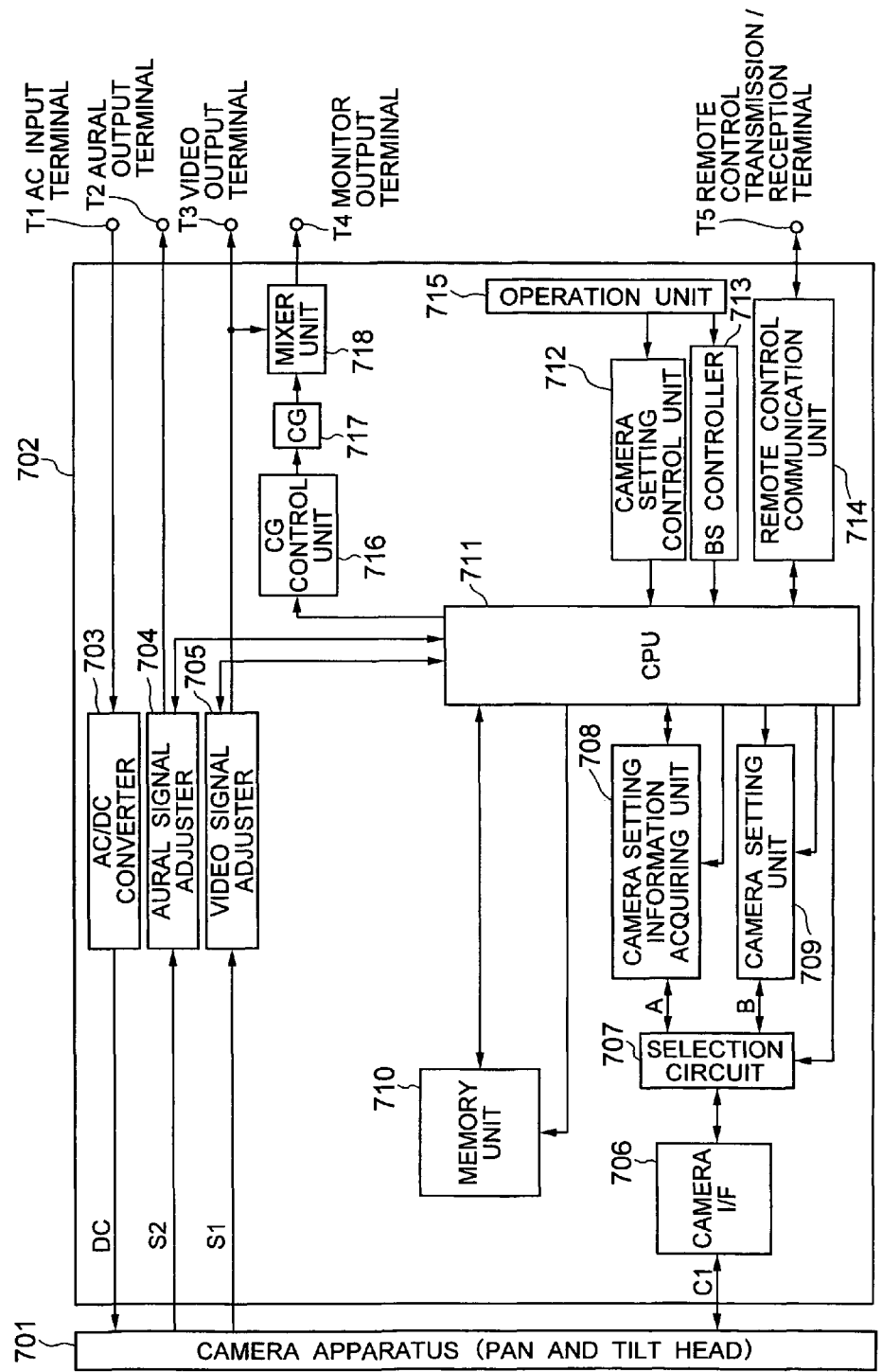
FIG. 7 is a block diagram of a camera control system, not publicly known, which has been studied in the course of making the present invention.

Referring first to FIG. 7, the schematic construction of a camera control unit, not laid open to public, devised by the present inventors in the course of making the present invention is illustrated in block diagram form. Prior to describing an embodiment of the invention, the FIG. 7 camera control unit will first be described.

In FIG. 7, reference numerals 701 and 702 designate a single camera apparatus and a single camera control unit, respectively.

In describing the FIG. 7 camera control unit hereunder, it is assumed that a plurality of sets of camera apparatus and camera control units are provided and respective camera control units are accommodated in a remotely located base station or service center not shown which is realized in the form of, for example, a broadcasting relay car or monitor room, thus constituting a camera control system.

The camera apparatus 701 is comprised of a camera unit and a pan and tilt head for driving the camera unit, these constituents being not shown. The camera apparatus 701 further includes a microphone not shown. The camera control unit 702 is coupled with the camera apparatus 701 to fetch images and voices from the camera apparatus 701 and perform various kinds of control of the camera apparatus 701. The camera control unit 702 can be controlled either by using a personal remote controller (not shown) connected to a remote control transmission/reception terminal T5 provided for a remote control communication unit 714 or by making a user operate an operation unit 715 (for example, a keyboard) to input necessary control signals. The following description will be given by way of example of the control carried out with the operation unit 715 the user operates.

An AC/DC converter 703 converts AC voltage inputted from an AC input terminal T1 into DC voltage to supply it to the camera apparatus. An aural (audio) signal S2 and a video signal S1 transmitted from the camera apparatus 701 will be attenuated or mixed with noises in cable transmission and therefore aural (audio) signal adjuster 704 and video signal adjuster 705 are provided which operate to filter, amplify and shape the aural (audio) signal S2 and video signal S1 and besides make impedance matching in compliance with the cable length. The thus processed signals are outputted from a voice (aural or audio) output terminal T2 and a video output terminal T3, respectively. The voice output and video output delivered out of the voice output terminal T2 and video output terminal T3 are fed to a recording unit such as VTR (not shown) and recorded thereon as necessary.

In adjustments the aforementioned aural signal adjuster 704 and video signal adjuster 705 make, a signal inputted from the operation unit 715 the user operates as necessary, for example, is supplied to a CPU 711 via a BS (base station) controller 713 to cause the CPU 711 to transmit control signals to the aural signal adjuster 704 and video signal adjuster 705 so as to adjust voice quality and image quality. The BS controller 713 is used for the purpose of controlling, for example, the aural signal adjuster 704 and video signal adjuster 705 of camera control unit 702.

The camera apparatus 701 and camera control unit 702 are controlled by operating the operation unit 715 as will be described below. When the user operates the operation unit 715 constructed of a keyboard comprised of switches, a control signal is outputted to a camera setting control unit 712 and delivered to a camera setting unit 709 and a camera setting information acquiring unit 708. In the camera setting unit 709, various conditions of the camera apparatus 701 such as for example pan and tilt of the pan and tilt head, zoom magnification of camera lens, focus adjustment, aperture and white balance are set. The camera setting condition acquiring unit 708 has the function of reading setting conditions set in the camera apparatus 701.

For example, when making an image (picture) adjustment, the user operates the operation unit 715 so that a command may be transmitted to the camera setting unit 709 and a necessary camera setting condition may be selected. Concurrently therewith, the CPU 711 selects a B terminal of a selection circuit 707, with the result that the condition set by the camera setting unit 709 causes, by way of a camera I/F 706, a control signal C1 to be delivered to the camera apparatus 701 and a setting condition of the camera apparatus 701 can be changed. In this manner, a parameter for image adjustment of the camera apparatus 701 can be changed.

Next, when examining setting parameters at present of the camera apparatus 701, the user operates the operation unit 715 and a command is transmitted to the camera setting information acquiring unit 708. At the same time, the CPU 711 selects an A terminal of the selection circuit 707. As a result, the camera setting information acquiring unit 708 delivers via the camera I/F 706 an output which commands the camera apparatus 701 to return its setting information. The camera apparatus 701 receiving the control command returns the setting information to the camera setting information acquiring unit 708.

The thus acquired setting information of the camera apparatus 701 is delivered to a CG (character generator) control unit 716 via the CPU 711 so as to control a character generator (CG) 717. A signal from the CG 717 is mixed with a video signal from the video signal adjuster 705 in a mixer unit 718 and is then delivered to a monitor output terminal T4. The CG control unit 716 and CG 717 function to convert the setting information of the camera apparatus 701 into characters. As a consequence, an image and characters prepared by the CG 717 are displayed in an overlapped fashion on a monitor display unit (not shown) connected to the monitor output terminal T4, thereby ensuring that the setting information at present of the camera in the form of a character display can be displayed along with the image and informed to the user. Structurally, the setting values of the aural signal adjuster 704 and video signal adjuster 705 controlled by the aforementioned BS control unit 713 and the camera setting value of camera apparatus 701 set under the control of the camera setting control unit 712 are registered from the CPU 711 to a memory unit 710 and saved therein.

In the camera control system, however, various kinds of setting values of the camera apparatus 701 and camera control unit 702 must be saved internally of the camera control unit 702, that is, in the memory unit 710 and individual setting values must be adjusted by using the operation unit 715 the user operates by himself or herself, thus forcing the user to set and manage them by himself or herself. Further, as the number of setting values increases, the setting operation becomes sophisticated.

As described above, the result of study of the FIG. 7 camera control system found out problems that setting values of the camera control unit and camera are saved internally of the camera control unit, data of the setting values must be managed by an engineer in charge of adjustments of the camera control unit and camera and the setting operation becomes sophisticated in proportion to an increase in the number of setting values.

Embodiments of the present invention will now be described with reference to the accompanying drawings. In the figures, like members are designated by like reference numerals.

Figure 2:
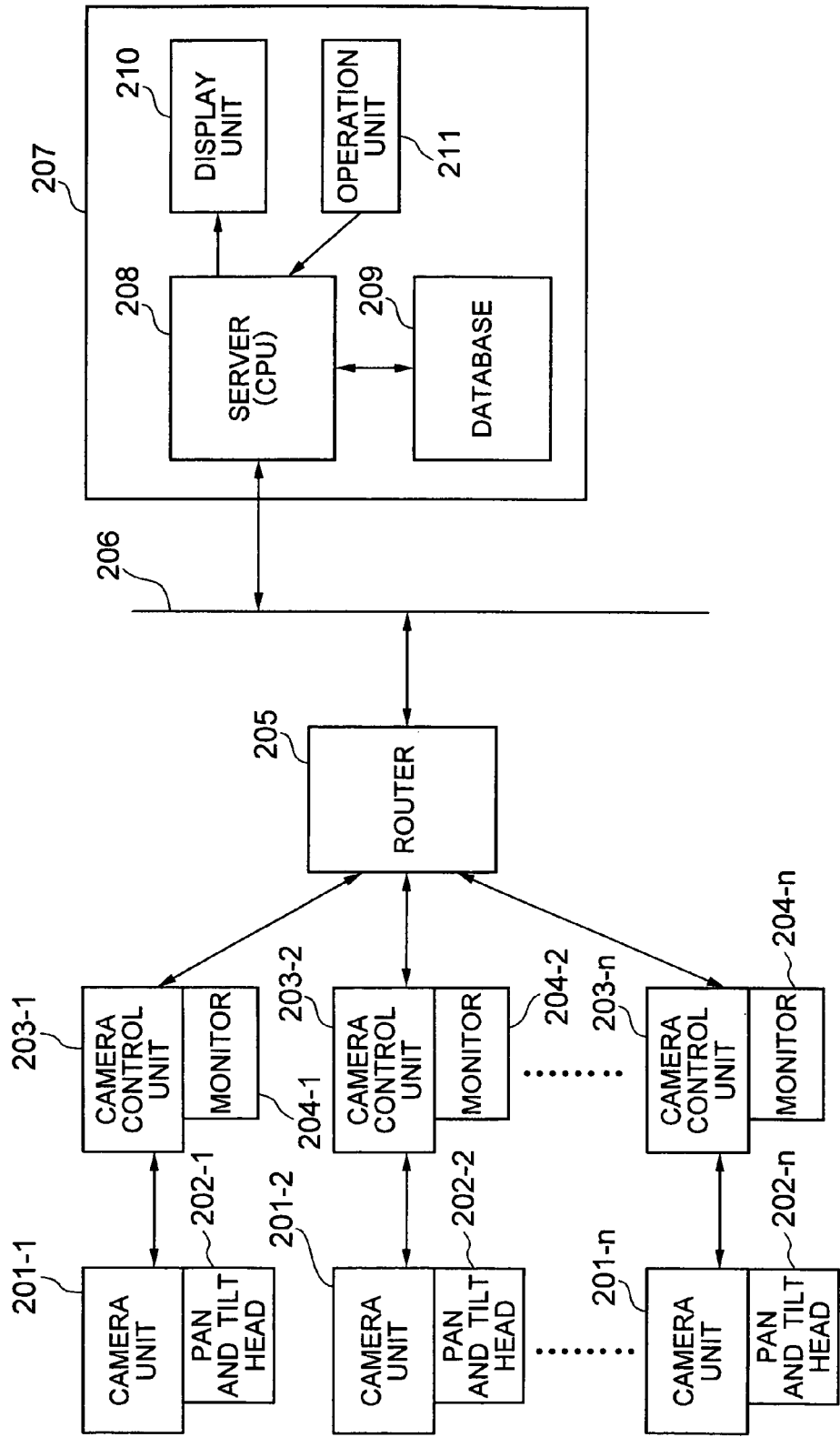
FIG. 2 is a block diagram showing the construction of a camera control system according to another embodiment of the invention.

Referring first to FIG. 2, a camera control system according to an embodiment of the invention is constructed as schematically illustrated therein in block diagram form. In the present embodiment, a camera apparatus is mounted on a pan and tilt head and can be applied, without delimitation, to a television broadcasting or video production system, finding its effective use as a monitoring apparatus also in the industrial and security fields.

In FIG. 2, reference numerals 201-1, 201-2, . . . 201-n designate n camera units, respectively. It is to be noted that when an arbitrary camera unit 201-i (i being 1 to n) is referred to, this camera unit is simply termed a camera unit 201. Denoted by 202-1, 202-2, . . . , 202-2 are n pan and tilt heads which move view field directions of individual cameras not shown. It is also noted that when an arbitrary pan and tilt head 202-i (i:1 to n) is referred to, this pan and tilt head is simply termed a pan and tilt head 202. This applies in the following description. Denoted by 203-1, 203-2, , 203-n are n camera control units. It is again noted that when an arbitrary camera control unit 203-i (i:1 to n) is referred to, this camera control unit is simply termed a camera control unit 203. Denoted by 204-1, 204-2, . . . , 204-n are monitor display units which are provided for the camera control units 203-1, 203-2, . . . , 203-n, respectively. It is again noted that when an arbitrary monitor display unit 204-i(i:1 to n) is referred to, this monitor display unit is simply termed a monitor 204. A router 205 connects to a transmission path constructed of, for example, Internet and a base station 207 is represented by a service center, for instance. The router 205 is a unit for suitably switching over connection of output signals from the individual camera control units 203 to the transmission path 206. The base station 207 includes a server 208 constructed of a CPU, a database 209, a display unit 210 and an operation unit 211. The singular base station 207 is illustrated but alternatively, a plurality of base stations may be provided in accordance with the number of camera apparatus connected to the transmission path 206.

For example, in the camera control system shown in FIG. 2, setting values for aural signal adjustment and video signal adjustment by the camera control unit 203 and various kinds of setting values of the camera unit 201 and pan and tilt head 202 which are set under the control of the camera control unit 203 are saved in the form of a database in the database 208 of base station 207. Then, in response to a request from a camera control unit 203, a necessary setting value can be down loaded to the memory unit of the camera control unit 203 through the transmission path 206. On the other hand, setting values for aural signal adjustment and video signal adjustment of a camera control unit 203 stored in the memory unit of the camera control unit 203 and various kinds of setting values of the camera unit 201 and pan and tilt head 202 which are set under the control of the camera control unit 203 are registered in the database 209 through the transmission path 206 in order that the various kinds of setting values of each camera unit 201, pan and tilt head 202 and camera control unit 203 can be reutilized or offered to the use by a user of a different camera control unit 203, that is, various kinds of setting data registered in the database 209 can be down loaded via the transmission path 206 in response to a request from the different camera control unit 203.

Returning to FIG. 1, the camera unit 201 and camera control unit 203 according to an embodiment of the present invention are constructed as illustrated therein in block diagram form.

The camera unit 201 and camera control unit 203 used in the present embodiment will be described in greater detail by making reference to FIG. 1. Components identical to those in FIG. 7 are designated by identical reference numerals. Components explained in connection with FIG. 7 will not be described herein.

Figure 1:
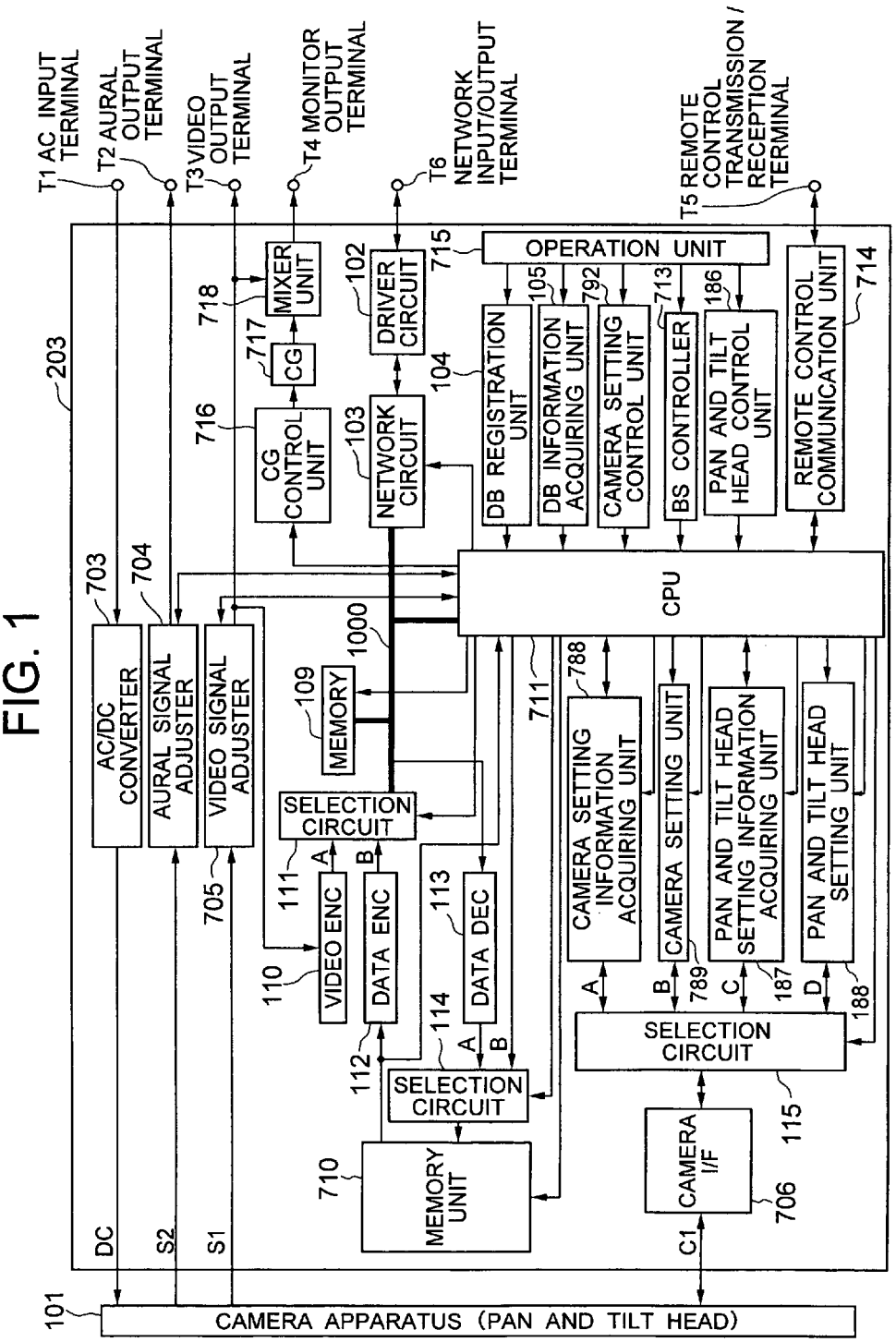
FIG. 1 is a block diagram showing the schematic construction of a camera control unit according to an embodiment of the present invention.

In FIG. 1, a camera apparatus 101 represents a camera unit 101-$i$ comprised of an arbitrary set of camera unit 201 and pan and tilt head 202 (that is, camera unit 201-$i$ and pan and tilt head 202-$i$). In connection with FIG. 7, the camera setting unit 709 has been described as being constructed to set values of various kinds of control conditions inclusive of a control condition of the pan and tilt head of camera apparatus 701, for example, values of pan, tilt, zoom magnification of camera lens, focus adjustment, aperture and white balance and the camera setting information acquiring unit 708 has also been described as being constructed to have the function of reading the setting values inclusive of the control condition of pan and tilt head set in the camera apparatus 701. In the present embodiment, however, a camera setting unit 789 and a pan and tilt head setting unit 188 are provided separately so that the camera unit and the pan and tilt head may be controlled separately and correspondingly, the camera setting information acquiring unit 708 in FIG. 7 is divided into a camera information acquiring unit 788 and a pan and tilt head setting information acquiring unit 187. Correspondingly, the camera control section 712 in FIG. 7 is also divided into a camera setting control unit 792 and a pan and tilt head control unit 186.

A memory 109 is coupled to selection circuit 111, network circuit 103 and CPU 711 through a bus 1000.

Firstly, how to control a set of camera unit 201 and pan and tilt head 202 constituting the camera apparatus 101 will be described. When the camera control unit 203 controls a pan and tilt head 202 at a remote location, an operator operates an operation unit 715, so that a control signal is outputted to the pan and tilt control unit 186 and a command to operate the pan and tilt head is inputted to the pan and tilt head setting unit 188 and pan and tilt head setting information acquiring unit 187 by way of the CPU 711. In case the direction of the pan and tilt head is desired to be changed, a command is sent to the pan and tilt head setting unit 188 while causing the CPU 711 to select a D terminal of a selection circuit 115. As a result, a setting value (change setting value for pan and tilt head) set by the pan and tilt head setting unit 188 is supplied to the pan and tilt head 202 through a camera I/F 706, thereby changing parameters for adjustment of the pan and tilt head, for example, pan and tilt.

When examining setting values at present of the pan and tilt head 202, a control signal is delivered out of the pan and tilt head setting information acquiring unit 187 to cause the CPU 711 to select a C terminal of the selection circuit 115, so that a command to return the pan and tilt head information is outputted and transmitted to the pan and tilt head 202 at the remote location through the camera I/F 706. The pan and tilt head 202 receives this control command for the pan and tilt head and returns setting information. The setting information transmitted from the pan and tilt head 202 is inputted to the pan and tilt head setting information acquiring unit 187. The aforementioned changed setting values of the pan and tilt head or the setting values at present of the pan and tilt head are stored in a memory unit 710 through the CPU 711. At that time, if a selection circuit 114 responds to a command from the CPU 711 to select a terminal B, changed setting values of the pan and tilt head or setting values at present are inputted from the CPU 711 to the memory unit 710. Concurrently therewith, setting information of the pan and tilt head is outputted to a CG control unit 716 by way of the CPU 711, converted into a predetermined literal form by means of a character generator 717 and supplied to a mixer unit 718. Accordingly, a video signal overlapped with character information can be obtained from a monitor output terminal T4 and can be displayed on a monitor 204 (that is, a monitor 204-$i$), thereby permitting the operator to know an image and the setting information of the pan and tilt head.

Changing of setting values of camera unit 201 and acquisition of setting values at present by means of the camera setting control unit 792 can be done through a similar operation and these setting values are saved in the memory unit 710. More particularly, when controlling a camera unit 201 at a remote location by means of the camera control unit 203, the operator operates the operation unit 715, so that a control signal is delivered to the camera setting control unit 792 and a command to the camera unit 201 is inputted to the camera setting unit 789 (and camera setting information acquiring unit 788) by way of the CPU 711. In case the command contains instructions to change the setting values, the command is sent to the camera setting unit 789 and the CPU 711 selects a B terminal of the selection circuit 115. As a result, setting values set by the camera setting unit 789 (changed setting values) are supplied to the camera unit 201 through the camera I/F so as to change parameters for adjustment, for example, setting values of zoom magnification of camera lens, focus adjustment, aperture and white balance.

Further, when examining setting values at present of the camera unit 201, the CPU 711 delivers a control signal to the camera setting information acquiring unit 788 and selects an A terminal of the selection circuit 115, so that a command to return camera setting information is outputted and transmitted to the camera unit 201 at a remote location through the camera I/F 706. The camera unit 201 receiving this command returns setting information. The setting information transmitted from the camera unit 201 is inputted to the camera setting information acquiring unit 788. The aforementioned changed setting values of the camera unit 201 or setting values at present are stored in the memory unit 710 through the CPU 711. At that time, the selection circuit selects a terminal B under the command of the CPU 711 and the changed setting values of the camera unit 201 or setting values at present from the CPU 711 are inputted to the memory unit 710. At the same time, the setting information of the camera unit 201 is delivered to the CG control unit 716 via the CPU 711, converted into a predetermined literal form by means of the character generator 717 and applied to the mixer unit 718. Accordingly, a video signal overlapped with character information can be obtained from the monitor output terminal T4 so as to be displayed on the monitor 204, thereby permitting the operator to know an image and the setting information of the camera unit 201.

The selection circuit 115 has the function of switching over the terminals A, B, C and D to select one of them under the command of the CPU 711.

Aural signal S2 and video signal S1 transmitted from the camera apparatus 101 will be attenuated or mixed with noise during transmission through the cable and therefore, as in the case of FIG. 7, aural signal adjuster 704 and video signal adjuster 705 in FIG. 1 operate to filter, amplify and shape these signals and besides make impedance matching in conformity with the cable length.

For example, in adjustments of the aural signal adjuster 704 and video signal adjuster 705, a signal the user inputs by operating the operation unit 715 as necessary is supplied to the CPU 711 through a BS (base station) controller 713 and then a control signal from the CPU 711 causes the aural signal adjuster 704 and video signal adjuster 705 to perform voice quality and image quality adjustments. Adjusted values are once stored in the memory 109 and thereafter read and written to the memory unit 710 or directly relayed from the CPU 711 to the memory unit 710 so as to be stored therein. For storage to the memory unit 710, the selection circuit 114 responsive to a command from the CPU 711 selects the terminal B to enable the setting values from the CPU 711 or the memory unit 109 to be inputted to the memory unit 710. These adjusted values are added to CCU parameters of FIG. 4 to be described later.

Next, how to carry out control with the database 209 of base station (or service center) explained in connection with FIG. 2 will be described. As described previously, the camera control unit 203 is connected to the base station 207 via the transmission path 206 and it can operate to down load various kinds of setting values registered in the database 209 of base station 207 to the camera control unit 203 or register (up load) various kinds of setting values the camera control unit 203 accumulates to the database 209 of base station 207. Details of this operation will be given hereunder.

Various kinds of setting values of, for example, pan and tilt of the pan and tilt head, zoom magnification of the camera lens, focus adjustment, aperture and white balance are registered in the database 209 of base station 207 in a table format.

As an example, a table is shown in FIG. 8, according to which a plurality of sets of preset setting values of pan and tilt of the pan and tilt head 202 and zoom magnification of an optical system of the camera unit 201 are allotted with preset numbers set by set in respect of individual camera units so as to be managed. Needless to say, this table can suitably contain, in addition to the preset setting values as above, desired parameter values such as setting values of the aural signal adjuster 704 and video signal adjuster 705.

When the operator of camera control unit 203 desires to down load a necessary set of preset setting values from the FIG. 8 table of the database 209, he or she first operates the operation unit 715 so that a control signal may be delivered to a DB (database) information acquiring unit 105. This control signal is sent from the CPU 711 to the server 208 of base station 207 through the medium of the network circuit 103, driver circuit 102 and network input/output terminal T6. At that time, in the presence of a specified setting value from the CPU 711 indicative of, for example, a camera unit 201-1 in FIG. 8, a command to down load preset No.1 is concurrently transmitted. The server 208 of base station 207 receiving this command finds out the designated data, that is, the preset No. 1 of camera unit 201-1 shown in FIG. 8 from the database 209 and returns corresponding setting conditions, for example, 21° pan angle, 10° tilt angle and 10 times zoom magnification to the camera control unit 203-1. The driver circuit 102 and network circuit 103 receive the thus returned data.

The received data are temporarily saved in the memory 109 and then delivered to a data DEC (data decoder) 113 under the control of the CPU 711. The data DEC 113 converts the data in data format of database 209 into data suitable for adjustment values of camera unit 201 and for control of the camera control unit 203 and pan and tilt head 202. While the CPU 711 selects an A terminal of the selection circuit 114, the thus converted data are saved in the memory unit 710. The saved data are used to set desired setting values to the camera unit 201, pan and tilt head 202 and camera control unit 203 under the control of the CPU 711.

When up loading (registering) setting data at present of the camera unit 201, pan and tilt head 202 and camera control unit 203 to the database 209 of base station 207, the operator operates the operation unit 715 to send a control signal to a DB (database) registration unit 104, which control signal is inputted to the memory unit 710 via the CPU 711. Concurrently therewith, a command necessary for performing upload is transmitted to the server 208 of base station 207 via the network circuit 103, driver circuit 102 and transmission path 206. As described previously, saved data is read out of the memory unit 710 and is inputted to a data ENC (encoder) 112 for conversion to the format of the database 209. With a B terminal of the selection circuit 111 selected by the CPU 711, output data of the data ENC 112 is temporarily stored in the memory 109. On the other hand, a video signal at present is inputted to a video ENC (encoder) 110 and hence, with an A terminal of selection circuit 11 selected by the CPU 711, a digitized image and image data are outputted from the video ENC 110 and stored in the memory 109 under the control of the CPU 711. The thus stored data is read by the CPU 711 and transmitted, through the network circuit 103 and driver circuit 102, so as to be delivered to the base station 207 from the network input/output terminal T6, thereby being up loaded to the database 209. In other words, various kinds of setting data now set to the camera unit 201, pan and tilt head 202 and camera control unit 203 are registered, together with the picked up image, in the database 209. Accordingly, when utilizing the thus registered data, a different user can see the image and setting data to conveniently make use of them.

Figures 3, 4:
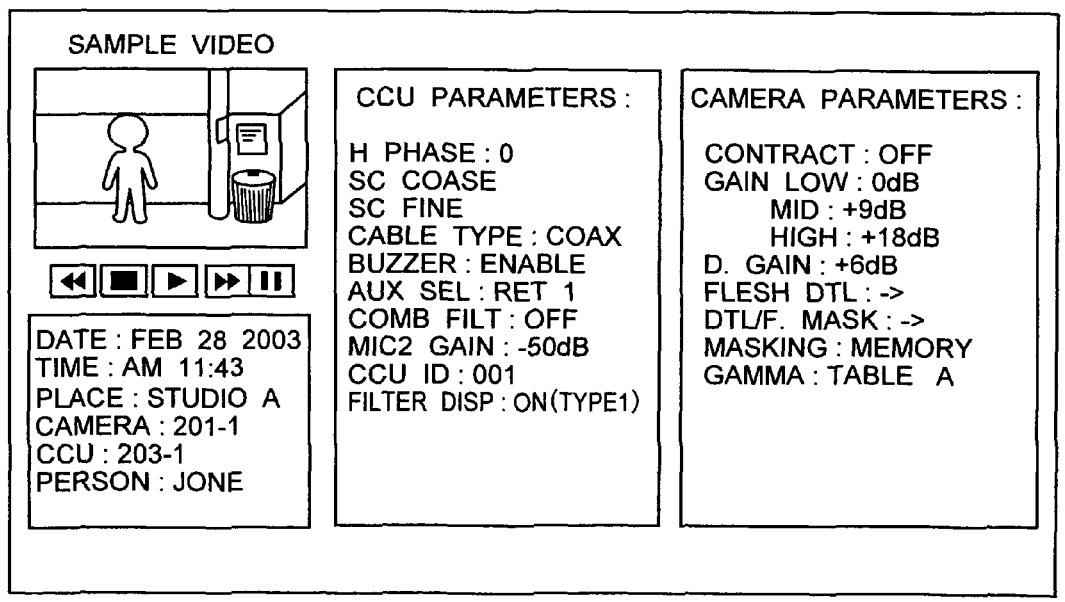
FIG. 3 is a diagram showing an example of a menu displayed on a monitor of the camera control unit of the invention.
FIG. 4 is a diagram showing an example of the contents of data recorded on a database of a service center and displayed on a display unit in the invention.

Referring to FIG. 3, there is shown an example of an output menu displayed on the monitor 204 when the camera control unit 203 accesses the database 209.

In FIG. 3, "Data Base Function 1" indicates a menu item name. "DATA BASE IP" indicates an IP address of database 209 exemplified herein as "192.132.10". "CCU IP" indicates an IP address of camera control unit 203-n exemplified as "192.132.1.200". "Action" indicates a command transmitted to the database 209, indicting as an example that "UP LOAD" is ready for transmission. Data to be transmitted during "UP LOAD" are "PICTURE" (image), "CAMERA File" (camera setting value) and "CCU File" (camera control unit setting value). "CAMERA" indicates an identifier (ID) now set of camera unit 201 which is exemplified herein as "201-n". "CCU" indicates an identifier (ID) presently set of camera control unit 203 which is exemplified herein as "203-n".

In this example, the menu shows an instance where for convenience of explanation, data of a single camera unit (CAMERA) 201-n and an associated camera control unit (CCU) 203-n are up loaded (registered) to the database 209. But in fact data of all camera units (CAMERA) 201 and associated camera control units (CCU) 203 are registered in the database 209 and therefore, the data of all camera units (CAMERA) 201 and camera control units (CCU) 203 can be seen by accessing the database 209 and the status of each camera unit (CAMERA) 201 and that of each camera control unit (CCU) 203 can be comprehended easily. In addition, access from a different camera control unit 203 can be assured and a setting value can be acquired when desired.

Turning to FIG. 4, there is shown an example of data on database 209 which is displayed on the display unit 210 when the menu item of "Data Base Function 1" shown in FIG. 3 is selected to execute a command of "UP LOAD" so that various kinds of setting values of camera unit 201-1 and camera control unit (CCU) 203-1 may be registered in the database 209. In this example, an image (Sample VIDEO) related to the camera unit 201-1 and camera control unit 203-1, parameters (CAMERA Parameters) of the camera unit 201-1 and parameters (CCU Parameters) of the camera control unit 203-1 are indicated. Accordingly, as will be clear from the foregoing description, the pickup image, various kinds of setting values of camera apparatus 101 and camera control unit 203 can be prepared in advance on the database or a used image and associated setting data can be registered so as to be managed centralizedly, thus eliminating the necessity for management by individual camera control units.

The example of FIG. 4 will be described in greater detail. An image of the FIG. 3 "PICTURE" is depicted at "Sample VIDEO". "Date", "Time", "Place", "Camera", "CCU" and "Person" depicted under "Sample VIDEO" indicate data when the "Sample VIDEO" is picked up, showing that the "Sample VIDEO" is an image taken by Mr. Jone in stadium A at 11:43 AM on Feb. 28, 2003 through the use of the camera unit 201-1 and camera control unit 203-1. "CCU Parameters" correspond to the contents of the FIG. 3 "CCU File" which includes various setting values of the camera control unit 203-1 during pickup of the "Sample VIDEO". Further, "CAMERA Parameters" indicate various kinds of parameter setting values of camera unit 201-1 during pickup of the "Sample VIDEO". Obviously, in addition to the data of "Sample VIDEO", parameter setting values of "CCU Parameters" and parameter setting values of "CAMERA Parameters" which are shown in FIG. 4, various kinds of data and parameter setting values can be registered on the database 209. For example, setting values of Red, Green and Blue levels may be included in the "CAMERA Parameters".

When data is down loaded from the database 209 to the camera control unit 203-1 in response to a request from the camera control unit 203-1, the camera control unit 203 accesses the database in a manner similar to that during the aforementioned upload to select a different Data Base Function menu in which for example, "Action" indicates "DOWN LOAD" and then data similar to that in FIG. 4 is displayed on the monitor 204-1. Subsequently, the operator of the camera control unit 203-1 operates the operation unit 715 to operate operation buttons displayed directly beneath the "Sample VIDEO" in FIG. 4 in order for the operator to search desired CCU Parameters and CAMERA Parameters from the registered old CCU Parameters and CAMERA parameters and register them in the camera unit control unit 203-1 and camera apparatus 101. In this manner, the old data can be reutilized. If, for example, an acquisition date and time of the desired data is known, the information may be inputted from the operation unit 715 for the sake of searching the desired data.

Figure 5:
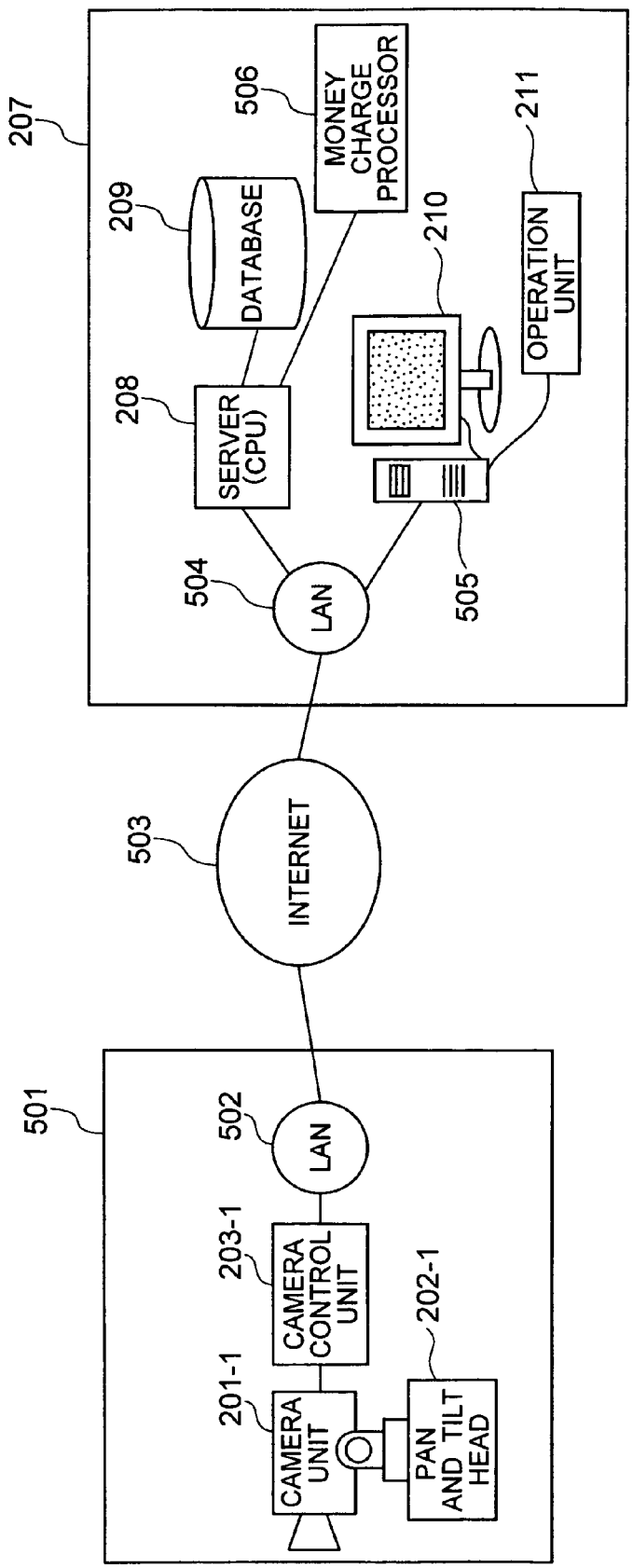
FIG. 5 is a block diagram showing the schematic construction of a remote maintenance system according to still another embodiment of the invention.

Referring now to FIG. 5, another embodiment of the invention will be described. Illustrated in FIG. 5 is an example of system for performing so-called remote maintenance in broad sense, with which an engineer having expert knowledge of camera systems (hereinafter called a camera diagnostic engineer) diagnoses a fault, incomplete adjustment and image quality of a camera system a user uses and advises or supports the user properly. In the figure, the same components as those in FIG. 2 are designated by the same reference numerals. A client system 501 having a camera control unit is coupled to a service center (or a base station) 207 through a transmission channel 503 such as Internet. The client system 501 includes, for example, a camera unit 201-1, a pan and tilt head 202-1, the camera control unit 203-1 and a LAN 502. For example, the LAN 502 corresponds to a LAN cable laid in a building to which many camera control units are connected. In FIG. 5, connection of the single camera control unit is exemplified. Likewise, a LAN cable 504 is also laid in the service center 207 and the LAN cable 504 is connected with a server 208 and a terminal unit 505. Denoted by 506 is a money charge processor to be described later.

The system shown in FIG. 5 is so constructed that a camera diagnostic engineer operates an operation unit 211 while watching a display unit 210 of the terminal unit 505 of service center 207. Then, the engineer makes a diagnosis by consulting images and setting values of the camera apparatus (for example, individual setting values shown in FIG. 4) sent from the client system 501 to check it for a fault or incomplete adjustment and offer optimum adjustment values to the client system 501. More particularly, as explained in connection with the FIG. 1 embodiment, various kinds of setting values (or adjustment values) or images of the camera are sent from the camera control unit 203 to a database 209 of service center 207 and the camera diagnostic engineer makes a diagnosis of the client system 501 by consulting data registered in the database 209 by way of the terminal unit 505 to guide or advise the system 501 in a fault or setting of optimum adjustment values. Accordingly, a camera control system capable of offering a new service to customers can be realized.

To describe more specifically, in the client system 501, the operator first operates the operation unit 715 as described in connection with FIG. 1 to make adjustments of the individual components of the camera unit 201 in camera apparatus 101, for example, adjustment of zoom magnification and aperture, adjustment of photographing direction by pan and tilt of the pan and tilt head 202, adjustment of the aural signal adjuster 704 and adjustment of video signal adjuster 705 and results of the adjustments are stored in the memory unit 710. Then, when registering a variety of setting values in the database 209 of service center 207, the operator operates the operation unit 715 to drive the DB registration unit 104 and CPU 711 so that various kinds of setting values and a picked up image, presently stored in the memory unit 710, may be transmitted to the service center 207 via the network circuit 103, driver circuit 102, network input/output terminal T6 and Internet 503. In the service center 207, the received various setting values and picked up image are processed by the server 208 and registered in the database 209. The contents is registered in the database 209 as shown in FIG. 4. It will be appreciated that in FIG. 5, the camera unit 201-1, pan and tilt head 202-1 and camera control unit 203-1 are illustrated as being provided singularly, for example, and in FIG. 4, adjustment values of the camera apparatus 201-1, pan and tilt head 202-1 and camera control unit 203-1 and the image are indicated. Practically, however, a plurality of camera apparatus are connected and therefore a plurality of pieces of data as shown in FIG. 4 are registered in the database 209.

Figure 6:
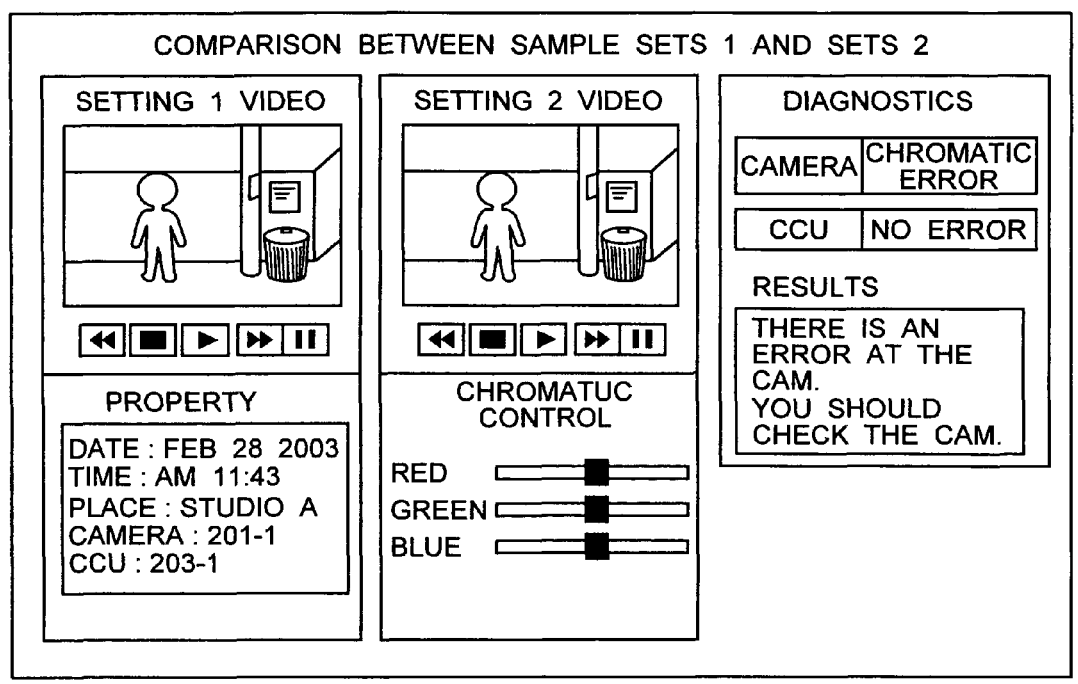
FIG. 6 is a diagram useful to explain camera diagnosis in the FIG. 5 remote maintenance system.

In the service center 207, the camera diagnostic engineer operates the terminal unit 505. When the operator of client system 501 asks the service center 207 to diagnose the camera system of his or her own, the camera diagnostic engineer operates the terminal unit 505 to display setting data and a picked up image sent from the client system 501 on the display unit 210 while accessing the server 208 so as to select data necessary for diagnosis from data registered in the database 209 (corresponding to data shown in FIG. 4). An example of this display is shown in FIG. 6. A picked up image 1 (indicated by Setting 1 VIDEO) and pickup conditions (indicated by Property) are illustrated in FIG. 6. Then, an image 2 (indicated by Setting 2 VIDEO) indicates an image the camera diagnostic engineer corrects through, for example, color control (indicated by "Chromatic Control"), that is, through chromaticity adjustment by changing the ratio of Red, Green and Blue. Further, at diagnosis result (indicated by "Diagnositics"), a message is displayed purporting that a chromatic adjustment error takes place in the camera unit (indicated by "Camera|Chromatic Error") and no error occurs in the camera control unit (CCU) (indicated by "Ccu|No Error") and therefore the diagnosis results (indicated by "Results") read that an error occurs in the camera unit and checking is necessary (indicated by "There is an error at the cam. You should check the cam.").

Accordingly, the camera diagnostic engineer transmits the diagnosis results shown in FIG. 6 to the camera control unit 203-1 of client system 501. In the camera control unit 203-1, the received diagnosis results are inputted to the CPU 711 by way of the network input/output terminal T6, driver circuit 102 and network circuit 103 and are once stored in the memory 109, followed by their storage in the memory unit 710 under the control of the CPU 117. Accordingly, by operating the operation unit 715 to display the diagnosis results stored in the memory unit 710 on the monitor 204-1 (in the form of display contents similar to that shown in FIG. 6), the operator of client system 501 can know from the diagnosis results what incompleteness the setting values the operator has set previously contains and how to correct these setting values. Consequently, the operator of client system 501 can correct individual setting values in the system on the basis of the diagnosis results, thereby permitting even an unskilled person to pick up an image of satisfactory contents.

A further description will be given of a money charge system for charging for service of the aforementioned fault diagnosis, maintenance and betterment guidance. In the foregoing, the operator of client system 501 has been described as making a request to the service center 207 for a diagnosis of the system, for instance. When this request is transmitted from the client system 501, the money charge processor 506 is started for operating. In this case, a money charge process schedule formatted as a table shown in FIG. 9, for example, is registered in the money charge processor 506.

As an example, service rank and charge money amount are tabulated in FIG. 9. The service rank indicates ranking defined in compliance with the contents of service of, for example, fault diagnosis, maintenance and betterment guidance. After diagnosing the client system 501 and consequently offering a service of service rank A1, the camera diagnostic engineer inputs the service rank A1 to the server 208 from the operation unit 211 of terminal unit 505. Receiving this input for designating the service rank A1, the server 208 accesses the money charge processor 506 to read a charge money amount B1 from the money charge table shown in FIG. 9 and calculate a necessary cost so as to charge the client system 501 for the cost. With this construction, a system for automatically charging for service can be constructed.

In addition to the application to monitoring, the present invention can also be applied to television broadcasting stations. An embodiment of the invention directed to the use in a television broadcasting station will be described by making reference to FIGS. 2 and 6.

The operator operates the operation unit 211 to display a picture of FIG. 6 on the screen of display unit 210. Subsequently, the operator operates the operation unit 211 to designate an image, picked up in the studio A (Place: Studio A) at 11:43 AM (Time: AM 11:43) on Feb. 28, 2003 (Date: Feb. 28, 2003) by using the camera unit (Camera) 201-1 and camera control unit (CCU) 203-1 and registered in the database 209, and display the designated image at display areas "Setting 1 VIDEO" and "Setting 2 VIDEO" of FIG. 6. When applying a chromatic correction (Chroma correction) to the image displayed at the "Setting 1 VIDEO" of FIG. 6, the operator performs the chromatic correction by moving knobs on the picture "Red", "Green" and "Blue" of "Chromatic Control" to right and left while watching the image of "Setting 2 VIDEO". Since the image at "Setting 2 VIDEO" is interlocked with the knobs "Red", "Green" and "Blue", the operator can watch results of the chromatic correction in the image at "Setting 2 VIDEO". In addition, since the image prior to the chromatic correction is displayed at "Setting 1 VIDEO", the images before and after the chromatic correction can easily be compared with each other. The operator can down load a chromatic correction value to the memory unit 710 of camera control unit 203-1 via the transmission path 206. The operator can also down load the chromatic correction value to designated ones of the plurality of camera control units 203-1 to 203-n.

As described above, according to the present embodiment, in contrast to the conventional camera apparatus and camera control unit in which the user (or operator) manages setting values saved internally, the setting values can be formatted into database on the server on the network and therefore can be managed centralizedly.

Further, formatting of data into database can permit setting values of programs used in the past to be diverted for use. Even in the presence of a great number of setting values, the user can fetch easily these values from the database and attend to simplified setting. Further, a camera control system which can easily receive service of setting values and maintenance as well as system diagnosis can be realized to advantage.

In the foregoing, the present invention has been described in detail but the invention is in no way limited to the embodiments of the camera control system set forth so far and is of course widely applicable to other types of camera control system than the above. In the foregoing embodiments, the camera apparatus comprises the pan and tilt head but obviously, the present invention can be practiced in the form of a camera control system devoid of any pan and tilt head.

The present invention has been described by way of the embodiments but it will be obvious to those skilled in the art to change and modify the present invention within the spirit thereof and within the scope of appended claims.

The invention claimed is:

1. A camera control system comprising:
a plurality of camera apparatus each including at least a camera unit;
camera control units being coupled to said plurality of camera apparatus by cables, respectively, including a memory unit storing setting values of the camera control unit and of an associated camera apparatus, a signal adjuster adjusting video and voice signals fetched from the camera apparatus with the setting value and outputting the adjusted video and voice signals, a video encoder for digitizing an image from the adjusted video signal, a character generator converting the setting value into a predetermined character, a mixer outputting the adjusted video signal overlapped with characters from the character generator, a CPU controlling the camera apparatus with the setting value remotely, an operation unit comprised of switches for user operation, a camera setting condition acquiring unit transmitting a command to the camera apparatus and reading the setting value set in the camera apparatus via a camera I/F, a camera setting unit supplying a setting value to the camera apparatus via the camera I/F, and a power supply feeding electric power to the camera apparatus;
at least one base station including a database for storing the setting values concerning at least video quality of said plurality of camera apparatus and corresponding said camera control units and a chromatic correction value, together with images picked up by the camera apparatus and digitized by the video encoder; and
a transmission network path for connecting the respective camera control units to said base station, whereby on the basis of the user operation, one of the camera control units transmits a command to said database for downloading an arbitrary setting value, modifies setting values of said corresponding camera control unit with said downloaded arbitrary setting value and outputs a video signal overlapped with characters so that user knows an image and the modified setting value set to the camera control unit, a setting value registered by one of the camera control units in the database is down loaded in response to a request from another camera control unit.

2. A camera control system according to claim 1, wherein said camera control system is for use in television broadcasting stations and is accommodated in a broadcasting relay car or monitor room.

3. A camera control system according to claim 2 further comprising monitor display units connected to the output of the mixer of the individual camera control units, wherein pieces of the data stored in said database are registered in a table format in respect of individual menus of plural processing functions, an arbitrary camera control unit is so constructed as responding to the user operation to be able to select a desired menu of said plurality of processing functions and said monitor display unit is so constructed as to display the selected menu.

4. A camera control system according to claim 3, wherein said camera control unit is so constructed as to respond to the user operation to display registration data related to said selected and displayed menu on said monitor display unit.

5. A camera control system according to claim 4, wherein the data registered in said database include a sample image, data for identifying the sample image and parameters of the camera control unit and camera apparatus when said sample image is picked up.

6. A camera control system according to claim 1, wherein at least one of said plurality of camera apparatus has a microphone and a pan and tilt head and said database is registered with, in addition to the setting value concerning the image quality, setting values concerning photographing direction and voice quality.

7. A camera control system accordingly to claim 1, comprising:
a terminal unit provided with a display unit in said base station;
wherein said terminal unit of said base station is so constructed as to access said database in response to an operation by an operator of said terminal unit and display registered setting values and a registered image on said display unit of said terminal unit in a modifiable fashion.

8. A camera control system according to claim 7, wherein said terminal unit displays an image of modification object and an image of comparison object based on said registered image with setting values related to said displayed image in a modifiable fashion, whereby the image of comparison object is interlocked with the modifying setting value and transmits the setting values modified by said operator to said camera control unit.

9. A camera control system according to claim 7, wherein data stored in said database are registered in a table format in respect of individual menus of plural processing functions.

10. A camera control system according to claim 9 further comprising monitors connected to the individual camera control units, wherein an arbitrary camera control unit is so constructed as responding to a command by an operator of said camera control unit to be able to select a desired menu of said plural processing functions and said monitor is so constructed as to display the selected menu.

11. A camera control system according to claim 10, wherein said camera control unit is so constructed as to respond to a command by said operator to display registration data related to said selected and displayed menu on said monitor.

12. A camera control system according to claim 11, wherein data registered in said database include a sample image, data for identifying said sample image and parameters of the camera control unit and camera apparatus when said sample image is picked up.

* * * * *